United States Patent [19]

Dill

[11] Patent Number: 5,118,235
[45] Date of Patent: Jun. 2, 1992

[54] WASHER WITH INTEGRAL FLAP AND FASTENING ASSEMBLY COMBINING FASTENER WITH SUCH WASHER

[75] Inventor: Michael C. Dill, Elk Grove Village, Ill.

[73] Assignee: Illinois Tool Works Inc., Glenview, Ill.

[21] Appl. No.: 653,060

[22] Filed: Feb. 11, 1991

[51] Int. Cl.⁵ .................. F16B 39/00; F16B 43/00
[52] U.S. Cl. .................. 411/368; 411/480; 411/531; 411/533; 411/908; 52/410; 52/512
[58] Field of Search .............. 411/368, 369, 370, 372, 411/373, 431, 531, 533, 908, 910, 480; 52/510, 512

[56] References Cited

U.S. PATENT DOCUMENTS

| | | | |
|---|---|---|---|
| 4,214,505 | 7/1980 | Aimar | 411/373 |
| 4,380,413 | 4/1983 | Dewey | 411/531 |
| 4,686,808 | 8/1987 | Triplett | 411/373 |
| 4,884,932 | 12/1989 | Meyer | 411/533 |
| 4,900,206 | 2/1990 | Kazino et al. | 411/431 |

*Primary Examiner*—Neill R. Wilson
*Attorney, Agent, or Firm*—Schwartz & Weinrieb

[57] ABSTRACT

A washer molded from a polymeric material and useful with a fastener having a head and a shank, such as, for example, a screw or a drive pin, and a fastening assembly comprised of the washer and such a fastener, is disclosed. The fastener head is contained within a washer socket with the fastener shank extending through a washer aperture. An integral flap hinged from a lateral wall portion of the washer socket is used to substantially cover the fastener head. The flap has a curved end, which is adapted to be snap-fitted under a locking formation, comprising a curved lip, formed upon a lateral wall portion of the socket which is disposed opposite the lateral wall portion upon which the flap is hinged.

21 Claims, 1 Drawing Sheet

U.S. Patent   June 2, 1992   5,118,235
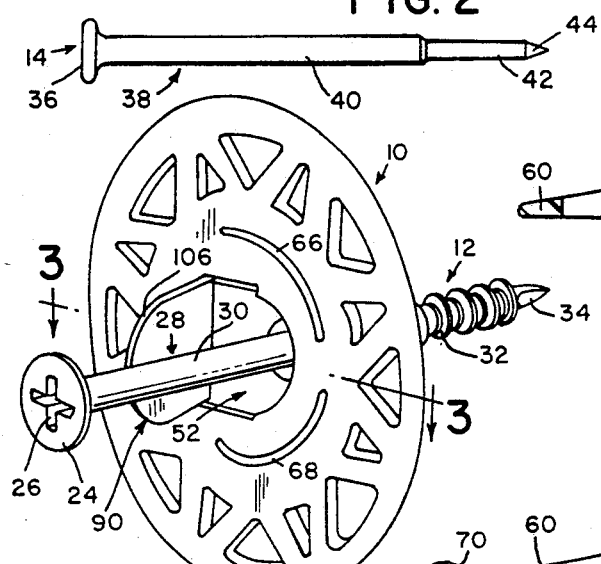
FIG. 2
FIG. 1
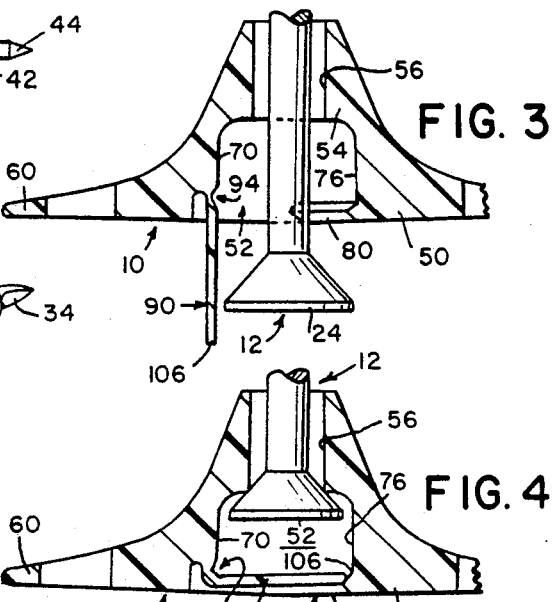
FIG. 3
FIG. 4
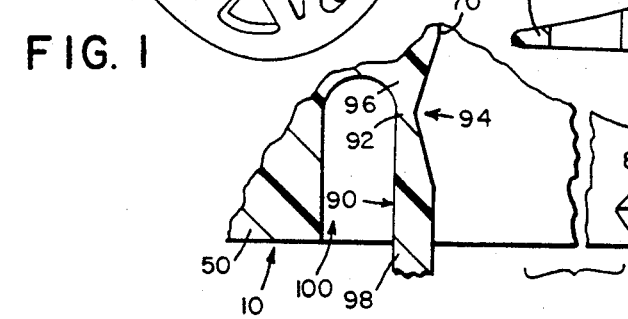
FIG. 5
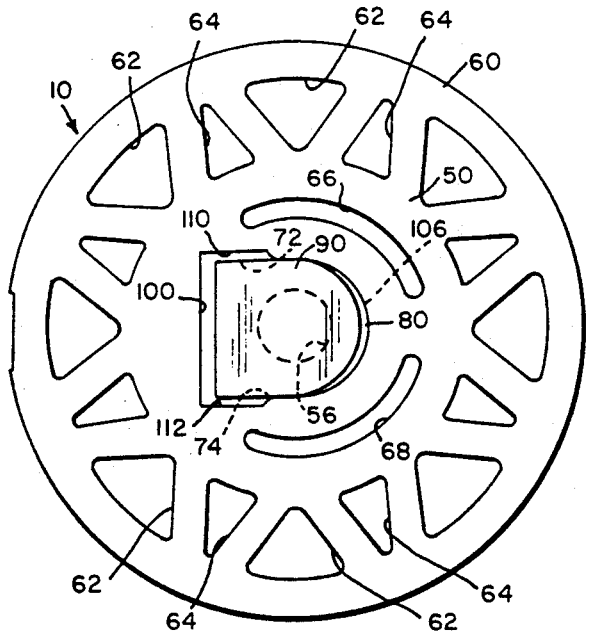
FIG. 6
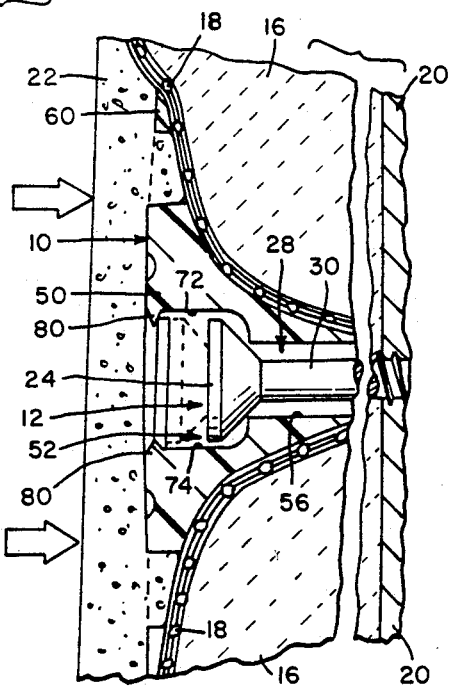
FIG. 7

WASHER WITH INTEGRAL FLAP AND FASTENING ASSEMBLY COMBINING FASTENER WITH SUCH WASHER

TECHNICAL FIELD OF THE INVENTION

This invention pertains to an improved washer useful with a fastener, such as, for example a screw or a drive pin, to fasten a compressible slab of insulation and a covering mesh to a wall or ceiling substrate. The improved washer has a novel structure, which includes an integral flap, for retaining the head of the fastener within the washer. This invention pertains, moreover, to a fastening assembly combining such a fastener with the improved washer.

BACKGROUND OF THE INVENTION

In connection with fastening a compressible slab of insulation or other material to a wall or ceiling substrate before a polymer, stucco, plaster, or other finish is applied over such insulation or other material, particularly but not exclusively in connection with an exterior application, it is known to use a fastener having a head and a shank, such as, for example, a screw, nail, or drive pin, and a washer having a socket for having the head of the fastener. Typically, the washer is molded from a polymeric material, such as, for example, polyethylene or polypropylene.

Moreover, it is known to cover the head of the fastener with a cover, which is pressed into the washer socket containing the fastener head. The cover may also be molded from the polymeric material used to mold the washer. The cover creates a thermal break between the fastener and the stucco, plaster, or other finish.

There has been a need, to which this invention is addressed, for improvements in connection with such washers.

SUMMARY OF THE INVENTION

This invention provides an improved washer useful with a fastener having a head and a shank, such as, for example, a screw, nail, or drive pin, to fasten a compressible body of insulation and a covering mesh, which may be optionally omitted, to a wall or ceiling substrate before a polymer, stucco, plaster, or other finish is applied over the compressible body and the covering mesh, if used. The improved washer has a novel structure, which includes an integral flap, for retaining the head of the fastener within the washer.

The improved washer is molded from a flexible, polymeric material. Polypropylene is a preferred material for the washer. Polyethylene is an alternate material for the washer.

The improved washer has a socket having an end wall with an aperture. The aperture is configured so as to permit the shank of the fastener to extend through the aperture but not to permit the head of the fastener to pass therethrough. The socket is configured so as to contain the head with the shank extending through the aperture.

The improved washer has an integral flap, which is hinged along a hinge line formed from the material of the flap. The socket has lateral walls including a lateral wall defining a locking formation spaced from an end wall. The flap is adapted to be snap-fitted under the locking formation. The flap is configured so as to substantially cover the fastener head, as contained by means of the socket with the fastener shank extending through the aperture, when the flap is snap-fitted under the locking formation.

Preferably, the locking formation comprises a curved lip extending from lateral wall portions of the socket, and the flap has a curved edge adapted to fit under the curved lip when the flap is snap-fitted thereunder. Also, it is preferred that the flap is joined integrally to other portions of the washer near one of the lateral walls of the socket, in opposed relation to the locking formation.

When a resilient polymeric material, such as, for example, polypropylene, is used for the washer including the flap, it is preferred that the washer has an unstressed shape, in which the flap extends outwardly with respect to the socket. Thus, when the flap is snap-fitted under the locking formation, the flap is stressed so as to be inherently biased against the locking formation.

As an additional feature, the washer may have a recess adjacent the flap so as to facilitate prying the flap from under the locking formation. The additional feature is useful if and when it is desired to remove a fastener, such as, for example, a screw, without damaging the washer.

Moreover, the washer provided by means of this invention may be advantageously combined with a fastener having a head and a shank, within a fastening assembly. In the fastening assembly, the fastener head is housed within the washer socket with the fastener shank extending though the aperture of the end wall portion of the washer socket. Moreover, the flap is snap-fitted under the locking formation.

BRIEF DESCRIPTION OF THE DRAWINGS

These and other objects, features, and advantages of this invention will become evident from the following description of a preferred embodiment of this invention with reference to the accompanying drawings in which like reference characters designate like or corresponding parts throughout the several views, and wherein:

FIG. 1 is a perspective view of a washer constructed according to this invention, as combined with a screw within a fastening assembly.

FIG. 2 is an elevational view of a drive pin, which in certain applications can be substituted for the screw within the fastening assembly shown in FIG. 1.

FIG. 3, on a larger scale, is a sectional view taken along line 3—3 of FIG. 1, in the direction indicated by means of the arrows, with the screw in a changed position.

FIG. 4 is a sectional view similar to FIG. 4 but taken with the screw in a further changed position and with the flap of the washer disposed in the closed position.

FIG. 5 is an enlarged, fragmentary detail of the washer, as shown in FIG. 3, with the screw omitted.

FIG. 6 is a further enlarged elevational view of the washer, as shown in FIG. 4, with the screw omitted.

FIG. 7 is a cross-sectional view showing the washer in its orientation of FIG. 6 and the screw as used to fasten a compressible body of exterior insulation and a covering mesh to a substrate.

DETAILED DESCRIPTION OF PREFERRED EMBODIMENT

As shown, a washer 10 constituting a preferred embodiment of this invention is useful with a fastener of a known type, such as, for example, a screw 12 shown in FIGS. 1, 3, 4, and 7, or a drive pin 14 shown in FIG. 2. The washer 10 is useful with either fastener to fasten a compressible body 16 of insulation and a mesh 18 covering the compressible body 16 to a substrate 20 before a finish 22 is applied over the compressible body 16 and the covering mesh 18. As compared to known washers for similar uses, the washer 10 has enhanced utility because the washer 10 not only creates a thermal break between the screw 12 and the finish 22, or between the drive pin 14 and the finish 22, but also positively locks the screw 12 or the drive pin 14 within the washer 10.

The compressible body 16 of insulation may be a compressible slab of expanded polystyrene or a compressible batt of semi-rigid fiberglass. As shown, the substrate 20 is a framework of wooden studs, with which the screw 12 is useful. The screw 12 would be similarly useful if a substrate made of light gauge steel framework or sheet were used.

The covering mesh 18 may be a metallic mesh or a non-metallic mesh, such as, for example, nylon or fiberglass. The covering mesh 18 may be non-woven, as shown, or woven and may have large apertures, as shown, or small apertures. Suitable meshes are available commercially from various sources.

The screw 12 has a head 24, which has a cross-shaped slot 26 adapted to coact with a driving tip (not shown) of a manual or powered tool of a known type. Also, the screw 12 has a shank 28, which has an unthreaded portion 30 adjoining the head 24, a threaded portion 32 adjoining the unthreaded portion 30, and a self-drilling tip 34 adjoining the threaded portion 32. Suitable screws are available commercially from various sources, which include ITW-Buildex (a division of Illinois Tool Works Inc) of Itasca, Illinois.

Rather than the screw 12, the drive pin 14 could be used instead if a substrate made of heavy gauge steel or other heavy gauge metal, concrete block, or masonry were used. The drive pin 14, which is made of hardened steel, has a head 36 and a shank 38, which has a portion 40 of larger diameter adjoining the head 36, a portion 42 of smaller diameter adjoining the portion 40, and a pointed tip 44 adjoining the portion 42. The drive pin 14 is adapted to be rapidly driven by means of a pneumatically powered, combustion-powered, or other powered tool (not shown) of a known type. Suitable drive pins are available commercially from various sources. In concrete/masonry construction, other fasteners could be used, such as, for example, threaded fasteners or nail-type anchors received within pre-drilled holes.

As shown in FIG. 7, the finish 22 is a stucco layer, which typically is made from a mixture of portland cement, sand, and a small percentage of lime. In present day practice, the exterior layer or finish 22 is more likely to be a polymer (acrylic) rather than stucco. For some applications, particularly but not exclusively interior applications, a plaster layer or a painted finish may be alternatively used as the finish 22. Typically, the finish 22 is applied in a plastic or fluid state and is allowed to cure under ambient conditions.

The washer 10 is molded from polypropylene, which is a suitable material because it is flexible, resilient, and thermally insulative. It is typical for a polymeric material, such as, for example, polypropylene, to be thermally insulative. The washer 10, which defines an axis, has a central, generally frusto-conical portion 50. The central portion 50 defines a central socket 52 having an end wall 54 with an axial aperture 56. The aperture 56 is configured so as to permit the shank 28 of the screw 12 or the shank 38 of the drive pin 14 to pass through the aperture 56 but not to permit the head 24 of the screw 12 or the head 36 of the drive pin 14 to pass through the aperture 56. The socket 52 is adapted to contain the head 24 of the screw 12 with the shank 28 thereof extending through the aperture 56 or the to contain the head 36 of the drive pin 14 with the shank 38 thereof extending through the aperture 56.

The washer 10 has an annular skirt portion 60 which surrounds the central portion 50. The skirt portion 60 has a plurality of larger, triangular apertures 62 and a plurality of smaller, triangular apertures 64. The apertures 62 and the apertures 64 are alternated in a regular, annular pattern, as shown in FIGS. 1 and 6. The central portion 50 has a pair of arcuate grooves 66, 68, which are spaced radially inwardly from the apertures 62 and the apertures 64, and which are spaced radially outwardly from the socket 52.

Besides the end wall portion 54, the socket 52 has lateral walls, namely a left side wall 70, upper and lower side wall portions 72, 74, and a right side wall portion 76, as viewed in FIGS. 3 and 7. The left side wall 70 and the upper and lower side walls 72, 74, are generally planar and meet at right angles. The right side wall portion 76 is generally semi-cylindrical and merges with the surfaces 72, 74, except for a locking formation 78. The locking formation 78 is defined by means of a curved lip 80, which extends from the right side wall 76, toward the left side wall portion 70, in axially spaced relation with respect to the end wall 54.

The washer 10 has an integral flap 90, which is hinged along a hinge line 94 formed from the material of the flap 90. Such a hinge may be conveniently called a "living" hinge, in common parlance. The flap 90 is joined integrally to the central portion 50 of the washer, by means of the hinged portion 92, near the left side wall 70 of the socket 52. The hinge 92 is defined by means of the hinge line or notch 94 extending across the flap 90 and dividing the flap 90 into a base part 96 and a distal part 98, as best seen in FIG. 5. A groove 100 defined within the central portion 50 separates the flap 90 from adjacent parts of the central portion 50. The distal part 98 of the flap 90 has a curved edge 106, which conforms generally to the right side wall portion 76 of the socket 52, below the curved lip 80. As shown in FIG. 3, the washer 10 has an unstressed shape, in which the flap 90 extends axially outwardly with respect to the socket 52 so as to be disposed substantially parallel to the axis of the washer 10.

The flap 90 is adapted to be snap-fitted, at the curved edge 106, under the curved lip 80. The curved edge 106 is adapted to fit under the curved lip 80 when the flap 90 is snap-fitted thereunder. It is noted again that the material of the washer 10 including the flap 90 is resilient. Thus, when the flap 90 is snap-fitted under the curved lip 80, the flap 90 is stressed so as to be inherently biased axially outwardly against the curved lip 80. The flap 90 is configured so as to substantially cover the fastener head, as housed within the socket 52 with the fastener shank extending through the aperture 56, when the flap 90 is snap-fitted under the curved lip 80.

As shown in FIG. 6, the washer 10 is provided with recesses 110, 112, adjacent the flap 90, each extending along one of the sides of the socket 52. The recesses 110, 112, are continuations of the groove 100. Each recess adjacent the flap 90 facilitates prying the flap 90 out from under the curved lip 80, by means of a flat blade (not shown) of a screwdriver or another similar prying tool, if and when it is desired to remove the fastener, such as, for example, the screw 12, without damaging the washer 10. However, each recess is sufficiently small so as to minimize infiltration of the finish 22 therethrough and into the socket 52.

As shown in FIG. 7, the washer 10 and the screw 12 are combined within a fastening assembly, which is useful to fasten the compressible body 16 of insulation and the covering mesh 18 to the substrate 20 before the finish 22 is applied thereover. Initially, the washer 10 is positioned against the covering mesh 18 with the flap 90 unstressed, as shown in FIG. 3. Thereupon, the screw 12 is positioned with the screw shank 28 extending through the aperture 56 and bearing against the covering mesh 18, or with the screw 12 extending through the aperture 56 and through an aperture of the covering mesh 18. After the screw 12 has been driven in such a manner that the compressible body 16 is compressed locally where pressed by means of the washer 10 with the screw head 24 housed within the socket 52, the flap 90 is snap-fitted under the curved lip 80 with the curved edge 106 fitted under the curved lip 80. Next, the finish 22 is applied over the washer 10, as well as over exposed areas of the compressible body 16 and over exposed areas of the covering mesh 18. The finish 22 penetrates the apertures 62, 64, the grooves 66, 68, the groove 100, and the recesses 110, 112, and penetrates some of the apertures of the covering mesh 18, so as to become interlocked with the washer 10 and the covering mesh 18 as the finish 22 cures.

Because the flap 90 substantially covers the screw head 24 disposed within the socket 52 when the flap 90 is snap-fitted under the curved lip 80, the flap 90 prevents infiltration of any substantial amount of the finish 22 into the socket 52. Thus, the flap 90 creates a thermal break between the screw head 24 and the finish 22. The thermal break is defined by means of the flap 90, which is thermally insulative because of the material of the washer 10 including the flap 90, and by means of the air space defined between the flap 90 and the screw head 24.

When the flap 90 is snap-fitted under the curved lip 80, the flap 90 retains the screw head 24 within the washer 10. Thus, if external forces are applied accidentally to the finish 22 (as suggested by means of the broad arrows in FIGS. 7) in such a manner that the screw head 24 bears against the flap 90 (as indicated by means of the illustration of the screw head 24 in phantom lines in FIG. 7) and would tend to break through the finish 22 but for the flap 90, the flap 90 distributes reactive forces from the screw head 24 across other parts of the washer 10, by means of the curved lip 80, so as to resist tendencies of the screw head 24 to break through the finish 22.

Similarly, the washer 10 is useful with the screw 12 or the drive pin 14 so as to fasten the compressible body 16 of insulation to the substrate 20 without the covering mesh 18, or before the covering mesh 18 is applied. A first group of such washers and such screws or drive pins may be initially used, at selected locations upon the substrate 20, so as to fasten the compressible body 16 to the substrate 20 without the covering mesh 18. A second group of such washers and such screws or drive pins may be subsequently used, at different locations upon the substrate 20, so as to fasten the covering mesh 18 over the compressible body 16 and to fasten the compressible body 16 to the substrate 20.

Various other modifications may be made in the washer disclosed herein without departing from the scope and spirit of this invention. It is therefore to be understood that within the scope of the appended claims, the present invention may be practiced otherwise than as specifically described herein.

I claim:

1. A washer for use with a fastener having a head and a shank, comprising:
    said washer being molded from a flexible, polymeric material and having a socket including an end wall with an aperture extending axially therethrough, said aperture being configured so as to permit said shank of said fastener to extend through said aperture but not to permit said head of said fastener to pass through said aperture, said socket being configured so as to house said head of said fastener while said shank extends through said aperture;
    said washer further comprising an integral flap made from said material of said washer and hinged along a hinge portion made from said material of said flap;
    said socket having lateral walls including a lateral wall defining a locking formation axially spaced from said end wall;
    said flap being adapted to be snap-fitted under said locking formation and being configured so as to substantially cover said head of said fastener disposed within said socket with said shank extending through said aperture when said flap is snap-fitted under said locking formation; and
    said washer having an unstressed shape by means of which said flap extends axially outwardly with respect to said socket, and wherein as a result of said polymeric material being resilient, said flap is stressed so as to be inherently biased against said locking formation in an axially outward direction when said flap is snap-fitted under said locking formation.

2. The washer of claim 1 wherein the flap is joined integrally to other parts of the washer, via the hinge, near one of the lateral walls of the socket, in opposed relation to the locking formation.

3. The washer of claim 2 wherein the locking formation comprises a curved lip extending from one of the lateral walls of the socket and wherein the flap has a curved edge adapted to fit under the curved lip when the flap is snap-fitted under the curved lip.

4. A washer as set forth in claim 1, wherein:
    said washer further comprises an annular skirt portion annularly surrounding said socket; and
    a plurality of apertures formed within said skirt portion for receiving a curable material which is disposed over said washer after said washer and said fastener have been secured to an underlying substrate.

5. A washer as set forth in claim 4, wherein;
    said plurality of apertures have substantially triangular configurations.

6. A washer as set forth in claim 5, wherein:
    said plurality of triangular apertures have base and apex portions thereof oppositely disposed with respect to each other in an alternate annular array.

7. A washer as set forth in claim 1, wherein:
    said flap has a substantially semi-cylindrical configuration.

8. A fastening assembly, comprising:
    a fastener having a head and a shank; and
    a washer;
    said washer being molded from a flexible, polymeric material and having a socket having an end wall and an aperture extending axially therethrough, said aperture being configured so as to permit said shank of said fastener to extend through said aperture but not to permit said head of said fastener to pass through said aperture, said socket housing said head of said fastener while said shank extends through said aperture;

said washer further comprising an integral flap made from said material of said washer and hinged along a hinge portion made from said material of said flap;

said socket having lateral walls including a lateral wall defining a locking formation axially spaced from said end wall;

said flap being snap-fitted under said locking formation and being configured so as to substantially cover said head of said fastener disposed within said socket with said shank of said fastener extending through said aperture when said flap is snap-fitted under said locking formation; and said washer having an unstressed shape by means of which said flap extends axially outwardly with respect to said socket, and wherein as a result of said polymeric material being resilient, said flap is stressed so as to be inherently biased against said locking formation in an axially outward direction when said flap is snap-fitted beneath said locking formation.

9. The fastening assembly of claim 8 wherein the flap is joined integrally to other portions of the washer, via the hinge, near one of the lateral walls of the socket, in opposed relation to the locking formation.

10. The fastening assembly of claim 8 wherein the locking formation comprises a curved lip extending from one of the lateral walls of the socket and wherein the flap has a curved edge adapted to fit under the curved lip when the flap is snap-fitted under the curved lip.

11. The fastening assembly of claim 8 wherein the fastener is a screw.

12. The fastening assembly of claim 8 wherein the fastener is a drive pin.

13. A fastening assembly as set forth in claim 8, wherein:

said washer further comprises an annular skirt portion annularly surrounding said socket; and a plurality of apertures formed within said skirt portion for receiving a curable material which is disposed over said washer after said washer and said fastener have been secured to an underlying substrate.

14. A washer for use with a fastener having a head and a shank, comprising:

a body portion being molded from a flexible, resilient, polymeric material;

an axially extending passage extending through said body portion and a socket in communication with said axially extending passage for respectively housing said shank of said fastener and said head of said fastener, said passage permitting said shank of said fastener to pass therethrough but preventing said head of said fastener to pass therethrough;

a flap integrally formed upon said body portion and hingedly connected to a sidewall portion of said socket;

a locking formation integrally formed upon another sidewall portion of said socket for cooperating with said flap in retaining said flap in a locked state as a result of said flap being snap-fittingly engaged with said locking formation as a result of which said flap covers said socket and overlies said head of said fastener disposed within said socket; and recess means formed within said body portion of said washer and within the vicinity of said flap for facilitating prying said flap to an open state from said locked state as a result of a tool being inserted within said recess means.

15. A washer as set forth in claim 14, wherein:

said washer further comprises an annular skirt portion annularly surrounding said socket; and a plurality of apertures formed within said skirt portion for receiving a curable material which is disposed over said washer after said washer and said fastener have been secured to an underlying substrate.

16. A washer as set forth in claim 15, wherein:

said plurality of apertures have substantially triangular configurations.

17. A washer as set forth in claim 16, wherein:

said plurality of triangular apertures have base and apex portions thereof oppositely disposed with respect to each other in an alternate annular array.

18. A fastening assembly, comprising:

a fastener having a head and a shank; and a washer molded from a flexible, resilient, polymeric material;

an axially extending passage extending through said washer, and a socket defined within said washer so as to be in communication with said passage, for respectively housing said shank of said fastener and said head of said fastener, said passage permitting said shank of said fastener to pass therethrough but preventing said head of said fastener to pass therethrough;

a slap integrally formed upon said washer and hingedly connected to a sidewall portion of said socket;

a locking formation integrally formed upon another sidewall portion of said socket for cooperating with said flap in restraining said flap in a locked state as a result of said flap being snap-fittingly engaged with said locking formation as a result of which said flap covers said socket and overlies said head of said fastener disposed within said socket; and recess means formed within said washer within the vicinity of said flap for receiving a tool in order to facilitate prying of said flap to an open state from said locked state defined with said locking formation.

19. A fastening assembly as set forth in claim 18, wherein:

said fastener comprises a screw.

20. A fastening assembly as set forth in claim 18, wherein:

said fastener comprises a drive pin.

21. A fastening assembly as set forth in claim 18, wherein:

said washer further comprises an annular skirt portion annularly surrounding said socket; and a plurality of apertures formed within said skirt portion for receiving a curable material which is disposed over said washer after said washer and said fastener have been secured to an underlying substrate.

* * * * *